Dec. 26, 1939.    H. E. SIPE    2,184,625
SLIDE FASTENER
Filed Jan. 2, 1936
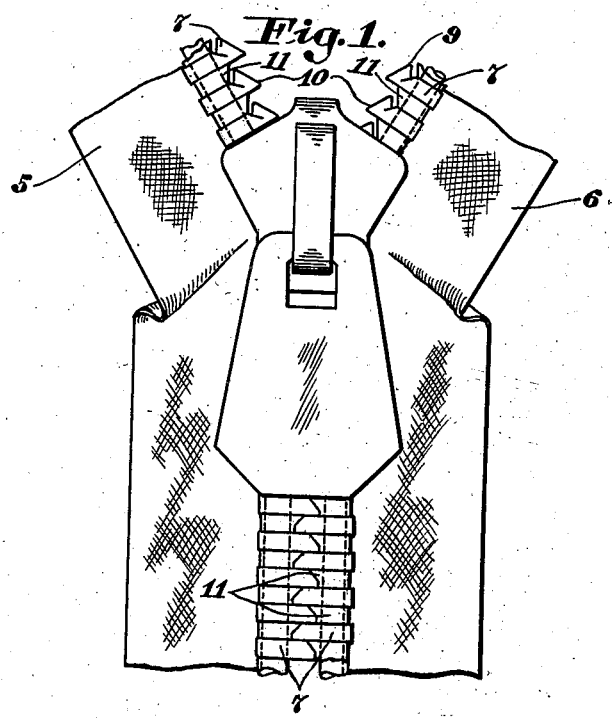
Fig. 1.
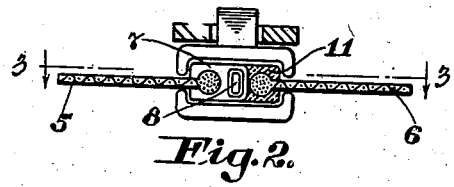
Fig. 2.
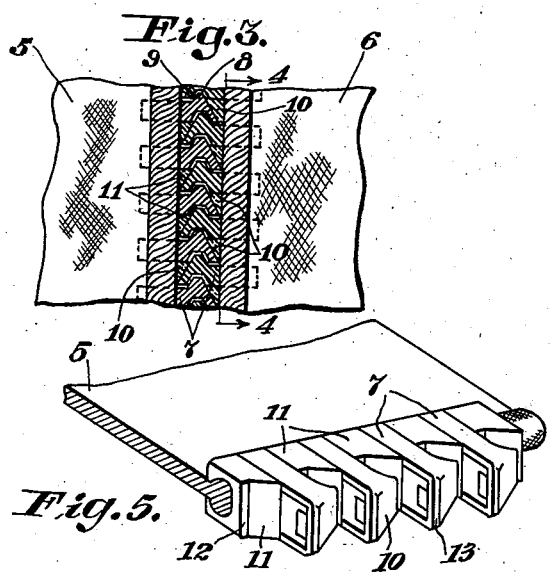
Fig. 3.
Fig. 5.
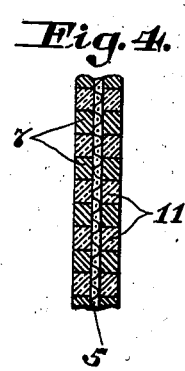
Fig. 4.
INVENTOR.
Harry E. Sipe.
BY Kelley + Chisholm
ATTORNEYS.

Patented Dec. 26, 1939

2,184,625

UNITED STATES PATENT OFFICE 2,184,625

SLIDE FASTENER

Harry E. Sipe, New York, N. Y., assignor to Talon, Inc., a corporation of Pennsylvania Application January 2, 1936, Serial No. 57,133

2 Claims. (Cl. 24—205)

My invention relates to fastening devices and more particularly to slide fasteners. Its principal object is to provide an improved slide fastener which will retain the well known flexible and quick operating characteristics of slide fasteners now in common use and which, at the same time, will be substantially airtight.

It is believed that my invention will widen the field of possible use of slide fasteners and it will make their use much more desirable on various articles where slide fasteners are already used. For example, the use of a slide fastener might be desirable improvement in a vacuum cleaner bag if it can be made substantially airtight. Even though it may be not absolutely airtight if the voids around the interlocking portions of the fastener are substantially filled, it will be dust-proof. It is also believed that an airtight fastener will have important advantages in many articles of outer clothing such as raincoats, jackets, overshoes, leggings and the like.

I am aware of various devices which have been suggested and used for covering up the fastener or for providing a supplemental sealing means in connection with the fastener. While some of these devices will effectively seal the opening when used in connection with the fastener there have been such serious objections to them that they have not been generally used. For example, the device suggested in the Waschiczeck Patent 1,839,068 requires the use of complicated mold structures if an attempt is made to manufacture it, and even if it were made, it would be almost useless because of the high degree of friction between slider and rubber covering; because of the uncertainty of the control by the slider of the interlocking elements due to the rubber between the elements and slider; and because of its bulkiness and weight.

According to my invention a suitable plastic filler is employed to fill the voids immediately surrounding the interengaging portions of the slide fastener. The sealing means is thus effected with a minimum amount of material and without increasing the bulk of the fastener or its wearing or operating qualities. It is desirable to employ a plastic material which will have a high degree of flexibility, such as lacquers of the more flexible nature or suitable rubber compounds. Although the more common vulcanizing processes are expensive and otherwise objectionable, some of the more modern processes of making rubber devices such as by the acid cure may be effectively used. Also rubber cement may be used as the vehicle for a filler such as white lead, red lead, roofing materials, and the like.

In the accompanying drawing, I have illustrated a slide fastener which has been treated in accordance with my invention. In the drawing:

Fig. 1 is a plan view showing a portion of the fastener;

Fig. 2 is a cross-section;

Fig. 3 is a longitudinal section showing a portion of the fastener; and

Fig. 4 is a detailed longitudinal section on line 4—4 of Fig. 3.

Fig. 5 is a perspective view of a section of one side of the fastener.

A conventional type of slide fastener is illustrated. It comprises a pair of flexible tape stringers 5, 6 which border the sides of the opening to be closed by the fastener and which provide suitable means by which the fastener is attached to the article. On the edges of the tapes there are attached the series of fastener elements 7. These elements are spaced apart and staggered so that the elements of one series will come between the elements on the opposite series and intermesh therewith. Each of the elements has a recess or socket 8 on one side and a projection 9 on the opposite side. These projections and sockets fit quite loosely together and in practice the elements are spaced apart a greater distance than the width of the fastener member in order to provide for increased flexibility to avoid any stiffness or tightening of the fastener if the materials to which the fastener is attached shrink. Furthermore, the ends of the fastener elements are inclined as indicated at 10 so that they do not fit against the edge of the opposite tape. As a result of the loose fit and the inclined ends of the fastener elements, it is impossible to make a fastener which will not have openings of substantial size permitting air to pass through. According to my invention the voids around the fastener elements are completely filled with plastic material which is indicated at various places by the numeral 11. This filler completely fills all of the spaces surrounding the interlocking heads of the fastener but does not interfere with the intermeshing and interlocking of the fastener elements.

As will be noted from the drawing, the plastic material substantially fills all the voids immediately surrounding the heads of the fastener elements, but it does not extend beyond the fastener elements. In other words the overall thickness of the fastener is not increased. When I refer to voids around the engaging portions of the fastener elements herein or in the appended claims, I refer only to those voids within the confines of the fastener elements when interlocked. The piece of filling material between a pair of fastener elements on a stringer has an inclined surface against which fits the inclined end of a fastener element on the opposite stringer. This beveled surface terminates in a narrow surface 12 which runs parallel to the stringer to fit against the square nose 13 on the fastener element.

The method of applying the plastic material consists briefly of interengaging the two series of fastener elements after they have been attached to their tape stringers. While so interengaged the plastic material will be applied in any suitable manner while in a liquid or semi-liquid state. If lacquer is used it may be applied by a brush and preferably a guard is used to protect the tapes 5, 6 adjacent the fastener elements. After the material has been applied it will break apart very easily to allow the fastener elements to separate. When the fastener is separated the filler material will stick to the tapes, and when the fastener is again engaged the elements will fit into the pockets of the filler material.

While I have shown and described in this application one embodiment which my invention may assume in practice it will be understood that this embodiment is merely for the purposes of illustration and description, and that various other forms may be devised within the scope of my invention as set forth in the appended claims.

What I claim as my invention is:

1. In a slide fastener, a series of intermeshing fastener elements and a plastic filler which substantially fills only all the spaces immediately surrounding the interengaging portions of the fastener elements when intermeshed, the slider contacting surfaces of the elements remaining uncovered by such plastic filler.

2. In a slide fastener of the class described, a pair of flexible tapes, cooperating series of fastener elements on the edges of the tapes, said elements being of rigid material and one series intermeshing with the other series, the shape of such elements being so as to leave spaces between the ends of the elements and the edge of the opposite tape, plastic material in said spaces attached to the tape surfaces adjacent thereto, said plastic material substantially filling said spaces, and a slider fitting over the outer surfaces of said elements for opening and closing the fastener, said outer surfaces coming in direct contact with the slider as the slider is moved over the elements.

HARRY E. SIPE.